(No Model.)

D. D. WRIGHT & W. R. BERRY.
SADDLE FOR VELOCIPEDES.

No. 479,969. Patented Aug. 2, 1892.

Witnesses
A. Keithley.
Harvey V. Gibson.

Inventors.
David D. Wright.
William R. Berry
By L. M. Thurlow Atty.

THE NORRIS PETERS CO., PHOTO-LITHO., WASHINGTON, D. C.

UNITED STATES PATENT OFFICE.

DAVID D. WRIGHT AND WILLIAM R. BERRY, OF PEORIA, ILLINOIS.

SADDLE FOR VELOCIPEDES.

SPECIFICATION forming part of Letters Patent No. 479,969, dated August 2, 1892.

Application filed February 11, 1892. Serial No. 421,105. (No model.)

*To all whom it may concern:*

Be it known that we, DAVID D. WRIGHT and WILLIAM R. BERRY, citizens of the United States, residing at Peoria, in the county of Peoria and State of Illinois, have invented certain new and useful Improvements in Velocipede-Saddles; and we do hereby declare the following to be a full, clear, and exact description of the invention, such as will enable others skilled in the art to which it appertains to make and use the same.

This invention relates to improvements in velocipede-saddles.

The object of the invention is to provide a seat so mounted on springs as to do away with as much vibration and jar as possible, and thus ease the rider and at the same time save the machine from unnecessary wear and tear.

Figure 1:
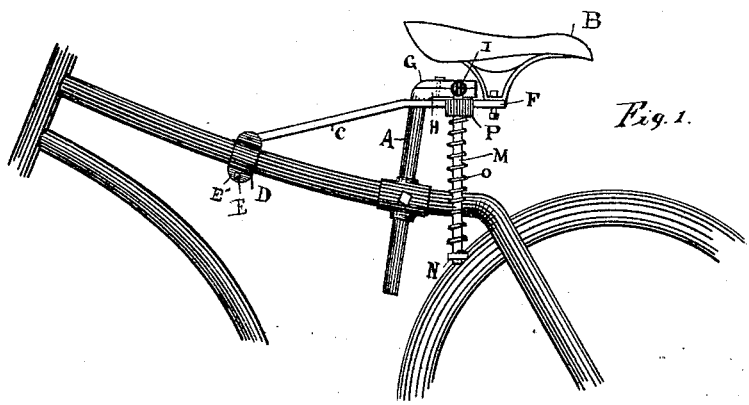
Figure 2:
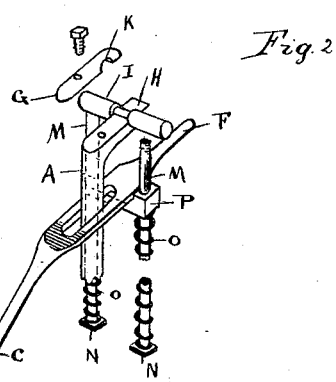
Figure 3:
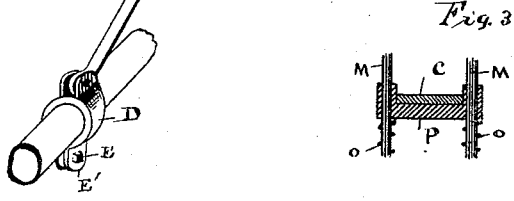

In the drawings hereto annexed, Figure 1 represents a side view of the saddle and its essential parts mounted on the frame of a bicycle. Fig. 2 is a perspective view of the invention, showing its parts separated to more clearly show the construction. Fig. 3 is a cross-sectional view of part of the invention, showing two vertical rods carrying spiral springs and a supporting U-shaped bracket in which the seat-rod rests.

A represents the L-post ordinarily used on bicycles, and on which the seat is mounted. In our invention the seat, instead of being secured on said L-rod, is mounted on an auxiliary rod C, which may be round or flat, but is shown in the drawings as round. The forward end of this rod is flattened and pivoted on a clip D, which is clamped to the frame of the machine by the means of the bolt E and ears E'. This rod C extends from its pivoted end upward on a slant toward the L-post A, and may be bent near said L-post so that the remaining portion may be horizontal, or nearly so. This horizontal portion of said rod C near the said L-post may be flattened, as shown in Figs. 2 and 3, and a slot cut therein to allow the rod A to pass through, and also to allow the said rod C to work up and down with ease as the weight of the rider is imposed upon it. The extreme rear end of this rod is made either flat or round, to allow of the easy adjustment of the saddle thereon, as shown at F, Fig. 1.

The L-post before mentioned is adjustably secured in the frame of the machine, while the upper horizontal portion is made in two halves G and H, as shown in Figs. 1 and 2, and in each half is cut a semicircular indentation K, and in which is held the rod I, the said rod having a short middle portion of its length turned down to fit said indentations K and leaving a shoulder formed on either end thereof, thus keeping said rod in place. The upper half G is clamped down on the lower half, over the said rod I, by a screw L, which passes down into the L-rod, as may be understood. Near either end of the said rod I is inserted a threaded vertical rod M, which passes through a U-shaped bracket or support P and carries on its lower end a head N, on which rests a spiral spring O, which encircles the rod, and on the springs O O rests the U-shaped bracket or support P, above described, and in this support rests the flattened portion of the rod C, as shown.

The operation of the device may be understood from the following: As the weight of the rider is imposed on the seat and on the rod C, the springs O O are brought into action by the compression of said springs between the support or bracket P and the headed ends of the rods M. The slot F in rod C is of such a length as to allow the said rod to play up and down for any distance without interfering with the L-post A. The device may be raised or lowered on the machine to suit all riders, as in other saddles, and may be shifted backward and forward by reason of the slot F and clamp D, or the saddle may be adjusted forward or back on the end of the rod C, as desired.

Having thus described our invention, what we claim as new, and desire to secure by Letters Patent, is—

1. In a velocipede-saddle, the L-post A, secured in the frame of machine and having its upper horizontal portion split in halves and each having the semicircular indentations K made therein to form a circular bearing, said halves being designed to clamp together, for the purposes herein set forth and described.

2. In a velocipede-saddle, a rod C, having one end pivoted to the frame of machine and having a portion of its length flattened and having a slot cut in said flattened portion for the purposes described and carrying on its opposite free end the adjustable saddle B, substantially as herein set forth and described.

3. In a velocipede-saddle, a rod I, clamped between the two halves of the L-post A in the manner set forth and described and provided near either end thereof with a vertical rod M, said rods being provided with spiral springs O O, supporting the bracket or support P, said springs bearing on the headed ends of the rods M M, for the purposes herein set forth and described.

4. In a velocipede-saddle, the L-post A, secured in the frame of machine, with the upper horizontal portion split in halves and securing the rod I in the semicircular indentations K, the vertical rods secured in the ends of said rod I and passing through the bracket or support P, and the springs O, resting on the headed ends of said vertical rods M M and supporting the said bracket or support P, and the rod C, pivoted on the frame of machine, having a portion thereof flattened and provided with a slot for the purposes set forth, and said rod C resting in the supporter-bracket P and carrying on its free end the adjustable saddle B, substantially as herein set forth and described.

In testimony whereof we affix our signatures in presence of two witnesses.

DAVID D. WRIGHT.
WILLIAM R. BERRY.

Witnesses:
HARVEY V. GIBSON,
A. KEITHLEY.